United States Patent [19]

Hoogenboom et al.

[11] Patent Number: 5,638,128
[45] Date of Patent: Jun. 10, 1997

[54] PIXEL INTERPOLATION FILTERS FOR VIDEO DECOMPRESSION PROCESSOR

[75] Inventors: Chris Hoogenboom, Calabasas; Bao Vuong, San Diego, both of Calif.

[73] Assignee: General Instrument Corporation of Delaware, Chicago, Ill.

[21] Appl. No.: 335,651

[22] Filed: Nov. 8, 1994

[51] Int. Cl.$^6$ ........................................................ H04N 7/50
[52] U.S. Cl. ......................... 348/416; 348/718; 364/723
[58] Field of Search .................................. 348/415, 416, 348/716, 718, 719, 720, 721; 364/723; H04N 7/50

[56] References Cited

U.S. PATENT DOCUMENTS

| | | | |
|---|---|---|---|
| 5,057,916 | 10/1991 | Krause | 348/416 |
| 5,068,724 | 11/1991 | Krause | 348/402 |
| 5,091,782 | 2/1992 | Krause | 348/402 |
| 5,093,720 | 3/1992 | Krause | 348/416 |
| 5,162,907 | 11/1992 | Keating et al. | 348/416 |
| 5,235,419 | 8/1993 | Krause | 348/416 |
| 5,379,356 | 1/1995 | Purcell et al. | 348/416 |
| 5,398,079 | 3/1995 | Liu | 348/699 |

OTHER PUBLICATIONS

Document MC68VDP/D, Preliminary Data Sheet entitled "MPEG–2/DCII Video Decompression Processor," ©Motorola Microprocessor and Memory Technologies Group, 1994.

*Primary Examiner*—Howard W. Britton
*Attorney, Agent, or Firm*—Barry R. Lipsitz

[57] ABSTRACT

A method and apparatus are disclosed for interpolating pixels to obtain subpels for use by a video decompression processor. A prediction area is defined from which subpels are necessary to decompress a portion of a video image. Instead of reading all of the pixels from the prediction area and then processing them together to perform the necessary interpolation, portions of the pixel data are read and simultaneously averaged using in-place computation in order to reduce hardware requirements. Rounding of subpixel results is achieved using the carry input of conventional adders to add a binary "1" to the averaged pixels, which are subsequently truncated to provide the interpolated subpels.

20 Claims, 11 Drawing Sheets

PIXEL INTERPOLATION FILTERS FOR VIDEO DECOMPRESSION PROCESSOR

BACKGROUND OF THE INVENTION

The present invention relates to a video decompression processor, and more particularly to an efficient scheme for providing horizontal, vertical and/or bidirectional interpolation of prior frame pixel data necessary to reconstruct a current video frame.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. For example, 7.4 megabits of data is required to provide one video frame at NTSC (National Television System Committee) resolution. This assumes a 640 pixel by 480 line display is used with eight bits of intensity value for each of the primary colors red, green and blue. At PAL (phase alternating line) resolution, 9.7 megabits of data is required to provide one video frame. In this instance, a 704 pixel by 576 line display is used with eight bits of intensity value for each of the primary colors red, green and blue. In order to manage this amount of information, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spacial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

Examples of video compression systems using motion compensation can be found in Krause, et al. U.S Pat. Nos. 5,057,916; 5,068,724; 5,091,782; 5,093,720; and 5,235,419. Generally, such motion compensation systems take advantage of a block-matching motion estimation algorithm. In this case, a motion vector is determined for each block in a current frame of an image by identifying a block in a previous frame which most closely resembles the particular current block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimating algorithms are particularly effective when combined with block-based spatial compression techniques such as the discrete cosine transform (DCT).

Each of a succession of digital video frames that form a video program can be categorized as an intra frame (I-frame), predicted frame (P-frame), or bidirectional frame (B-frame). The prediction is based upon the temporal correlation between successive frames. Portions of frames do not differ from one another over short periods of time. The encoding and decoding methods differ for each type of picture. The simplest methods are those used for I-frames, followed by those for P-frames and then B-frames.

I-frames completely describe a single frame without reference to any other frame. For improved error concealment, motion vectors can be included with an I-frame. An error in an I-frame has the potential for greater impact on the displayed video since both P-frames and B-frames are predicted from an I-frame.

P-frames are predicted based on previous I or P frames. The reference is from an earlier I or P frame to a future P-frame and is therefore called "forward prediction." B-frames are predicted from the closest earlier I or P frame and the closest later I or P frame. The reference to a future picture (i.e., one that has not yet been displayed) is called "backward prediction." There are cases where backward prediction is very useful in increasing the compression rate. For example, in a scene in which a door opens, the current picture may predict what is behind the door based upon a future picture in which the door is already open.

B-frames yield the most compression but also incorporate the most error. To eliminate error propagation, B-frames may never be predicted from other B-frames. P-frames yield less error and less compression. I-frames yield the least compression, but are able to provide random access entry points into a video sequence.

One standard that has been adopted for encoding digital video signals is the Motion Picture Experts Group (MPEG) standard, and more particularly the MPEG-2 standard. This standard does not specify any particular distribution that I-frames, P-frames and B-frames must take within a sequence. Instead, the standard allows different distributions to provide different degrees of compression and random accessibility. One common distribution is to have I-frames about every half second and two B-frames between successive I or P frames. To decode P frames, the previous I-frame must be available. Similarly, to decode B frames, the previous and future P or I frames must be available. Consequently, the video frames are encoded in dependency order, such that all pictures used for prediction are coded before the pictures predicted therefrom. Further details of the MPEG-2 standard (and the alternative DigiCipher® II standard) and its implementation in a video decompression processor can be found in document MC68VDP/D, a preliminary data sheet entitled "MPEG-2/DCII Video Decompression Processor," © Motorola Microprocessor and Memory Technologies Group, 1994, incorporated herein by reference.

In order to implement video compression in practical systems, a video decompression processor is required for each digital television receiver. The development of very large scale integration (VLSI) integrated circuit chips is currently underway to implement such video decompression processors. In consumer products such as television sets, it is imperative that the cost of the system components be kept as low as possible. One of the significant costs associated with a video decompression processor is the random access memory (RAM) required to (i) buffer the compressed data prior to decompression, (ii) store the previous frame data necessary to predict a current frame using motion estimation techniques, and (iii) buffer the decompressed data prior to its output to a video appliance such as a television set, video tape recorder or the like. Another significant cost of a decompression processor is in the hardware necessary to calculate the predictions of current frame data from prior frame data, especially when interpolation is necessary among adjacent pixels to provide subpixel ("subpel") data required for the prediction.

The efficient utilization of the random access memory referred to above by a video decompression processor, and typically implemented in external DRAM, requires a scheme that can utilize a minimal amount of memory while maintaining the required data access rates (i.e., memory bandwidth). DRAMs are typically organized as an array of rows (also referred to as "pages") and columns. One of the rules of DRAM operation is that a change in row address results in a slow access for the first data of the new row. Thus, in order to maximize DRAM I/O bandwidth, it is desirable to read data such that it causes the minimum number of changes in the row address. Thus, it is advantageous to tailor the memory map to minimize row changes. It is further advantageous to sequentially access the data stored in the memory. Such sequential accesses are fast and therefore desirable. Random accesses, on the other hand, which may require frequent changes in the row address, are slow and therefore undesirable.

In a video decompression processor, such as one conforming to the MPEG (Motion Picture Experts Group) or DigiCipher® II (DCII) standards, various processes, including prediction calculation, require DRAM access. When the prediction of a current frame block from a previous frame is good, i.e., the prediction frame bears a close resemblance to the frame to be transmitted, only a small amount of residual error remains for transmission. This leads to a high compression efficiency. If a bad prediction is made, then the residual error may be so large that the compression efficiency is adversely affected. Thus, an accurate prediction of the frame-to-frame movement in a video sequence is essential in achieving a high compression ratio.

For a typical video sequence, the scene may contain many objects that move independently at various speeds and directions. In order to ease hardware implementation and limit the amount of information needed to represent each movement, a frame of video is often segmented into rectangular blocks. One then assumes that only the blocks are moving with independent speeds and directions. In order to reduce system complexity and increase speed, the area which is searched for the best match between a current frame block and the previous frame may be limited to the neighborhood around the target block. This limitation in the search area is usually acceptable because the movement of an object in most typical video sequences is seldom fast enough to create a large displacement from one frame to the next. With a limited search area, it is possible to efficiently perform an exhaustive search to find the best match. Once the best match is found, the prediction frame is constructed by assembling all the best matching blocks together. To implement this in hardware, the previous frame is stored in a random access memory and the prediction frame is generated block by block from the memory by reading one pixel at a time using the proper displacement vector for that block.

This method produces a good prediction frame when the objects in a video sequence are displaced both vertically and horizontally by an integer number of pixels. However, for a typical video sequence, the object movements are not usually an integral number of pixels in distance. For those cases where the displacement falls between two pixels, a better prediction frame can be generated by using values that are interpolated from adjacent pixels. If one considers only the midpoints between pixels, there are three possible modes of interpolation, i.e., horizontal, vertical and diagonal. Horizontal interpolation consists of taking the average of two horizontally adjacent pixels. Vertical interpolation is generated by computing the average between two vertically adjacent pixels. Diagonal interpolation requires the averaging of four neighboring pixels. An example of a half-pixel interpolation processor for a motion compensated digital video system can be found in commonly assigned, U.S. patent application Ser. No. 08/009,831 filed on Jan. 27, 1993 now U.S. Pat. No. 5,398,079 and incorporated herein by reference.

The prediction calculation required in a video decompression processor using motion compensation is one of the most difficult decoding tasks, particularly where interpolation is required. Ideally, a VLSI design for such a decompression processor will be fast, small, simple and memory bandwidth efficient. Conceptually, the easiest approach for implementing a prediction calculation function would be to read in all of the data necessary to compute the prediction in a simple sequential order, and then perform whatever interpolation filtering is required. However, such a simplistic approach is disadvantageous for various reasons. If the hardware waits until after all of the data has been read in before starting the filtering function, large amounts of storage will be required. Further, only a fixed time is available in which to calculate the prediction. If it is necessary to read in all of the data before performing the filtering, only a short period of time is left to do the filtering itself. As a rule, more hardware is necessary when less time is available to perform a calculation. Still further, if data is read in a sequential order, many row changes and poor DRAM I/O bandwidth will result.

It would be advantageous to provide a video decompression processor in which DRAM I/O bandwidth is improved and which does not require a large amount of complex hardware in order to calculate the prediction data necessary for motion compensation. It would be further advantageous to provide efficient and compact filters for providing horizontal, vertical and bidirectional subpel interpolation, which filters can be easily implemented in a practical VLSI design. The present invention provides subpel filters having the aforementioned advantages for use in a video decompression processor.

SUMMARY OF THE INVENTION

In accordance with the present invention, a method is provided for interpolating pixel data provided in multi-pixel words arranged in rows of a video frame. A first set of at least one of the words is selected to be interpolated from a row of the video frame. The pixel data for each word in the set is interpolated in an interpolation direction (e.g., horizontally) defined by the row. The interpolated pixel data for the first set of words is temporarily stored in a memory. A subsequent set of at least one of the words is then selected to be interpolated from a next successive row of the video frame. The subsequent set of words is located adjacent the first set of words such that each word of the subsequent set has a counterpart word in the first set. The pixel data for a word in the subsequent set is interpolated in the same interpolation direction (e.g., horizontally) used for the pixel data in the first set. The interpolated pixel data for the word in the first set that is the counterpart of the interpolated word from the subsequent set is read from the memory and averaged (e.g., vertically) with its counterpart interpolated pixel data from the subsequent set. At the same time the counterparts are being averaged, the counterpart interpolated pixel data from the subsequent set is stored in the memory in place of the counterpart interpolated pixel data of the first set. In this manner, a small memory (such as a simple dual port register file) can be used to store a portion of horizontally interpolated pixel data from a first row within the prediction area while counterpart pixel data from the next row is being horizontally interpolated, and the two horizontally interpolated portions can then be vertically interpolated one word at a time while the most recent horizontally interpolated data overwrites the just used prior horizontally interpolated data.

The interpolation of pixel data from each successive row in the prediction area continues in this manner until the pixel data in all of the rows of a desired portion of the prediction area has been interpolated.

The method of the present invention can be performed in a manner that reduces the number of times the row address must be changed when retrieving pixel data from a frame store in which the pixel data is stored. In particular, a prediction area of a video frame from which pixel data is to be interpolated is defined. A determination is made as to whether the prediction area encompasses pixel data from more than one page of a frame store in which the video frame is stored. In the event that the prediction area encompasses pixel data from more than one page of the frame store, successive sets of words to be interpolated are selected such that all of the pixel data in the prediction area from a first page of the frame store is interpolated before the pixel data from a subsequent page of the frame store is interpolated.

In order to provide pixel data from a first page that is necessary when interpolating pixel data in an adjacent second page without crossing back to the first page in the frame store, the pixel data adjacent a page boundary of the first page is temporarily stored in a separate memory. This enables the interpolation of pixel data residing adjacent the page boundary in a page of the frame store currently being interpolated without readdressing the frame store to cross back into the first page.

The method of the present invention is also useful in providing horizontally and vertically interpolated pixel data for use in reconstructing bidirectional (B) frames. Pixel data is interpolated for a prediction area of an intra-frame (I) or predicted-frame (P) picture (i.e., an "anchor frame") and possibly for a prediction area of a second I or P picture for bidirectional interpolation. The interpolated pixel data for one of the I or P pictures is temporarily stored in a bidirectional data store while the pixel data for the other of the I and P pictures is being interpolated. The temporarily stored interpolated pixel data from the bidirectional data store is averaged with the interpolated pixel data for the other of the I and P pictures as the latter is being interpolated. The averaged I and P interpolated pixel data is then written into the bidirectional data store for subsequent use in decoding a bidirectional picture. The averaged I and P interpolated pixel data can be written into the bidirectional data store in place of the I or P interpolated data that was read therefrom.

Horizontally and vertically interpolated pixel data obtained by the method of the present invention can be truncated. Such truncation is particularly useful to round the subpixel results away from zero.

A subpixel interpolation filter for a video motion estimation processor is also disclosed. Means are provided for generating a first set of N subpels by averaging adjacent pixels contained in a first vector of (N+1) pixels within a row of a prediction area. The first set of subpels is temporarily stored. Means are provided for generating a second set of N subpels by averaging adjacent pixels contained in a second vector of (N+1) pixels from a subsequent row of the prediction area. The second vector in the subsequent row is the counterpart of the first vector in the first row. Each subpel from the stored first set of subpels is averaged with a counterpart subpel from the second set as the counterpart subpels in the second set are being generated. This averaging provides a third set of subpels representative of the pixel data interpolated in two dimensions, e.g., horizontally and vertically.

The subpixel interpolation filter can further comprise means for storing each subpel from the second set in the storing means in place of its counterpart subpel from the first set at the same time the second set subpel is being averaged with its counterpart first set subpel. In this manner, a small amount of memory can be used for the storing means because subpels from a first row of the prediction area are immediately overwritten by subpels from the next row as the counterpart subpels from the two rows are being averaged.

Means can be provided for determining when the prediction area encompasses pixel data from more than one page of a frame store in which the pixels being interpolated are stored. Means responsive to the determining means successively select vectors of pixels to be interpolated from successive rows within the prediction area such that all of the pixel data in the prediction area from a first page of the frame store is interpolated before the pixel data from a subsequent page of the frame store is interpolated. In this manner, the number of page boundaries that are crossed when interpolating all of the pixels from the prediction area is minimized. Pixel data adjacent a page boundary of a previously interpolated page can be temporarily stored to enable pixel data residing adjacent the page boundary in a page of the frame store currently being interpolated to be processed without crossing the page boundary.

To enable the reconstruction of bidirectional frames, pixel data from a prediction area of an I picture and from a prediction area of a P picture can be interpolated. The interpolated pixel data for one of the I or P pictures is temporarily stored in a bidirectional data store and averaged with the interpolated pixel data for the other of the I and P pictures while the latter is being interpolated. The averaged I and P interpolated pixel data is written into the bidirectional data store for subsequent use in predicting the B-frame. In order to conserve memory, the averaged I and P interpolated pixel data can be written into the bidirectional data store in place of the I or P interpolated data that was just read therefrom.

A horizontal pixel interpolation filter is provided for a video decompression processor in which an input receives consecutive words, each containing N pixels from a prediction area of a video prediction frame. The consecutive words are received during successive clock cycles. Means are provided for delaying the consecutive words of pixel data by one clock cycle. Register means hold a first pixel from each consecutive word received at the input, together with the immediately preceding word from the delay means. Means are coupled to receive and average the adjacent pixels held in the register means each clock cycle to provide successive sets of horizontally interpolated subpels for use by the video decompression processor.

A vertical interpolation filter can be provided for vertically interpolating the horizontally interpolated subpels provided by the horizontal pixel interpolation filter. The vertical interpolation filter includes an input for receiving successive sets of horizontally interpolated subpels during successive clock cycles. Means are provided for buffering the successive sets of the horizontally interpolated subpels for averaging with vertically adjacent counterpart sets of horizontally interpolated subpels in the prediction area. The buffered sets of horizontally interpolated subpels are averaged with the counterpart sets to provide successive sets of horizontally and vertically interpolated subpels for use by the video decompression processor.

A bidirectional interpolation filter is provided for use in combination with the horizontal and vertical interpolation filters. The horizontal and vertical interpolation filters are used to interpolate pixel data from a prediction area of an I picture and from a prediction area of a P picture. Means are provided for temporarily storing interpolated pixel data for one of the I or P pictures in a bidirectional data store and averaging it with the interpolated pixel data for the other of the I and P pictures while the latter is being interpolated by the horizontal and vertical interpolation filters. The averaged I and P interpolated pixel data is written into the bidirectional data store for subsequent use in decoding a B-frame.

The averaging means of the horizontal pixel interpolation filter can comprise a plurality of adders coupled to the register means. Each adder adds two adjacent pixels from the register means to provide a sum. Each adder includes a carry input adapted to add a binary "1" to the sum. Means are provided for truncating the sum by its least significant bit, resulting in a subpel that is rounded away from zero.

The horizontal interpolation filter can be used in conjunction with a random access memory (RAM) in which the video prediction frame is stored as a set of tiles. Each tile contains pixel data and occupies one page (i.e., row) of the RAM. The interpolation filter further comprises memory means for storing a subset of words from the prediction area adjacent a first side of a vertical page break. Means are provided for inputting a word from the memory means to the register means instead of inputting the immediately preceding word from the delay means when pixels adjacent a second side of the vertical page break are being interpolated. In this manner, the number of times that different pages in the random access memory must be addressed is minimized.

Horizontal, vertical and bidirectional interpolation filters are provided by the present invention. These filters can be used alone or in combination depending on the requirements of the video decompression processor. Although the term "horizontal" is generally used to refer to rows of a matrix and "vertical" is generally used to refer to the columns of a matrix, it is not intended to so limit these terms in the present disclosure and claims, and it should be understood that these terms are interchangeable to the extent necessary to provide the broadest possible interpretation of the invention disclosed herein.

DETAILED DESCRIPTION OF THE INVENTION

Figure 1:
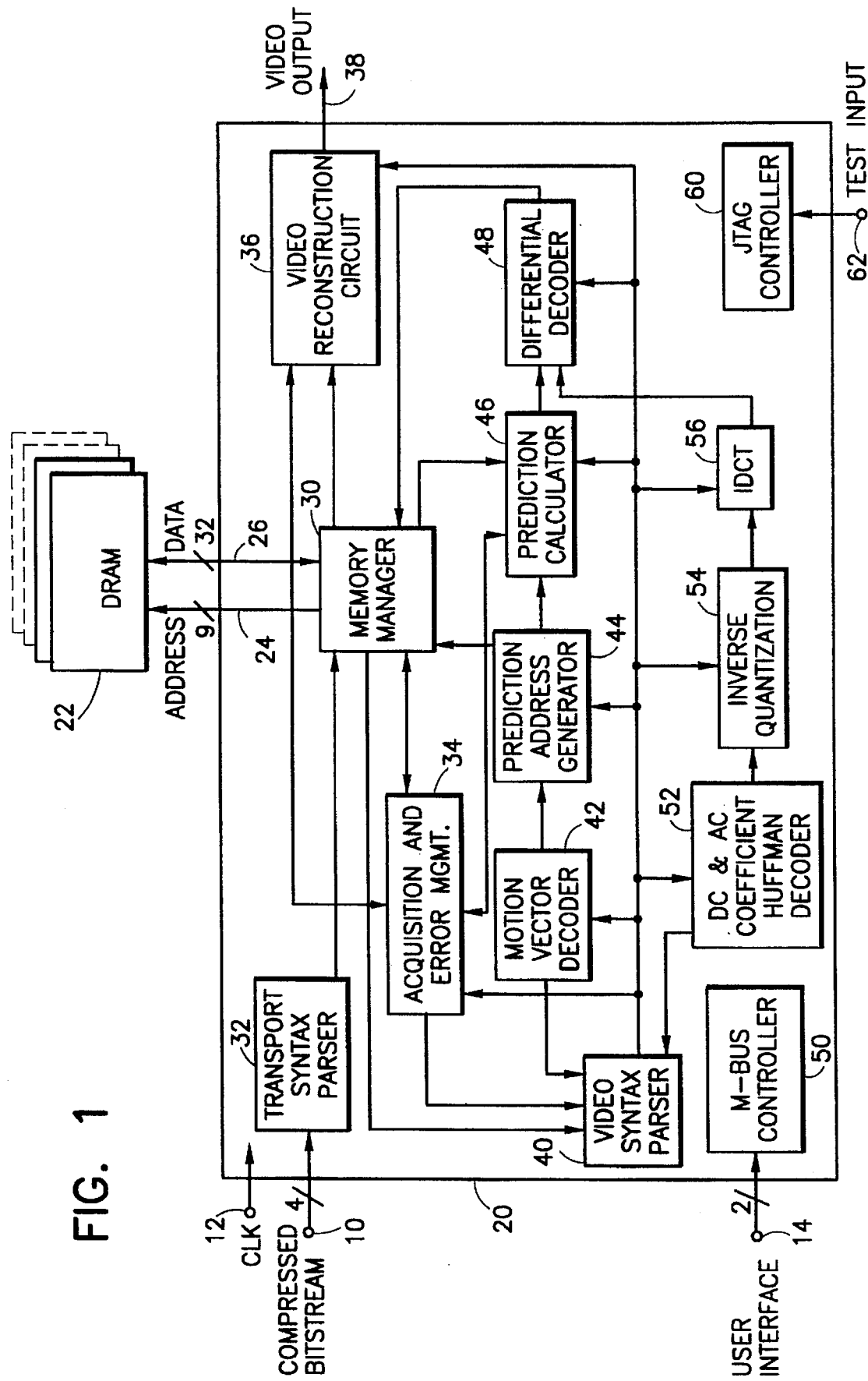
FIG. 1 is a block diagram of a video decompression processor in accordance with the present invention.

FIG. 1 is a block diagram of a video decompression processor incorporating a memory manager 30 that addresses external DRAM 22 in a manner that minimizes the number of row changes as prediction data is being read from the DRAM. The processor, generally designated 20, is a pipelined processor designed to decode both the transport layer (i.e., control and other non-video information) and the video layer of the compressed bitstream input via terminal 10, sometimes referred to as the "transport packet interface" of the video processor.

A user processor interface is provided at terminal 14 for control of the video data processor via an M-bus controller 50 that configures various registers in processor 20. The M-bus is a two-wire, bidirectional serial bus which provides a simple and efficient means of data exchange between devices, and is fully compatible with the I$^2$C bus standard.

An interface to the DRAM 22 is provided via address lines 24 and data lines 26. In the specific embodiment illustrated in FIG. 1, DRAM 22 has a nine bit address port and a thirty-two bit data port.

A video output interface 38 is provided for the decompressed, reconstructed video which may, for example, be output as a standard CCIR (International Radio Consultive Committee) 656, eight bit, twenty-seven MHz multiplexed luminance (Y) and chrominance (Cr, Cb) signal.

A test interface can be provided via terminal 62 to a conventional JTAG (Joint Test Action Group) controller 60. JTAG is a standardized boundary scan methodology used for board-level testing to detect faults in package and board connections, as well as internal circuitry.

The video decompression processor 20 receives a clock signal via terminal 12. The clock provides timing information for, e.g., enabling a transport syntax parser 32 to recover timing information and video information from transport packets in the compressed bit stream input via terminal 10. An acquisition and error management circuit 34 utilizes a program clock reference (PCR) and decode time stamp (DTS) detected by a video syntax parser 40 to synchronize the start of picture decoding. This circuit sets vertical synchronization and provides global synchronization for all video decode and display functions.

The video layer is buffered in an input buffer (FIFO) configured in the external DRAM 22 by memory manager 30. The video syntax parser 40 receives the compressed video data output from the DRAM FIFO via memory manager 30, and separates the motion vector information from the coefficients describing the video information. The coefficients are processed by a Huffman decoder 52, inverse quantizer 54, and inverse discrete cosine transform (IDCT) processor 56.

Motion vectors are recovered and used to address previously decoded video frames required for reconstructing a current video frame. In particular, a motion vector decoder 42 decodes the motion vectors received from video syntax parser 40 and passes them to a prediction address generator 44. The prediction address generator provides address information necessary to retrieve, via memory manager 30, the necessary anchor frame (i.e., I or P frame) data to enable prediction calculator 46 to provide a prediction signal necessary to reconstruct a current frame block. Differential decoder 48 combines the prediction data with the decoded coefficient data to provide decompressed video data. The decompressed data is stored in appropriate buffers of DRAM 22 via memory manager 30.

It should be appreciated that although the video decompression processes carried out by motion vector decoder 42, prediction address generator 44, prediction calculator 46, differential decoder 48, Huffman decoder 52, inverse quantizer 54 and IDCT 56 are generally conventional and well understood by those skilled in the art, the specific filtering apparatus and method used by the prediction calculator 46 to interpolate pixel data is new and forms the basis of the present invention. The unique aspects of the prediction calculator are described in greater detail below.

Memory manager 30 schedules all activity on the external DRAM address and data buses 24, 26 and efficiently addresses DRAM 22. The memory manager insures that the data transfer requirements of the input FIFO portion of DRAM 22, the video syntax parser 40 and the video reconstruction circuit 36 (as well as prediction calculator 46 and differential decoder 48) are all met. The video reconstruction circuit 36 calculates a current picture and inserts closed caption, a vertical interval test signal (VITS) and test pattern data for output on video output line 38. The output display is synchronized by comparing the PCR to a presentation time stamp (PTS). A determination of when the decoding and display of a video frame must commence is made by comparing a decode time stamp (DTS) to the PTS.

The memory manager also provides a variable size for the FIFO portion of DRAM 22 depending on the decoding mode, which can be, for example, NTSC or PAL with or without bidirectional prediction frames (B-frames). The video buffer control ensures that the FIFO provided by DRAM 22 does not overflow or underflow. Buffer control is a function of system timing parameters including the PCR and DTS.

DRAM 22 is illustrated as an external memory and may be provided by a plurality of DRAM chips, such as two, four Mbit (megabit, i.e., $2^{20}$ bits) DRAMs for an eight Mbit implementation or four, four Mbit DRAMs for a sixteen Mbit implementation. It should be appreciated that in future implementations, and as memory technology advances, DRAM 22 may be provided as internal memory within the video decompression processor. The DRAM is mapped to provide various decode and output video buffers as well as a circular FIFO for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 30 to provide different memory maps as required when variables are modified such as the video frame vertical size, PAL or NTSC video, the presence of test patterns, eight or sixteen Mbit memory configuration, and whether B-frames are present.

The memory manager 30 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

When a compressed bitstream is input to terminal 10 of video decompression processor 20, video frames represented by the bitstream are reconstructed one at a time. Initially, a full frame of video data will have to be received and stored in DRAM 22. Information for subsequent video frames can comprise a subset of the full video frame which, when added to prediction data from the prior video frame (stored in DRAM 22) will result in the reconstruction of a full frame. As each new intra picture (I) or predicted picture (P) video frame is reconstructed, it is stored in DRAM 22 for use as an anchor frame necessary to reconstruct a subsequent frame represented by data in the compressed bitstream and for display at the appropriate time in the video sequence. As each bidirectionally predicted frame (B-frame) is reconstructed, it is stored for display at the appropriate time. The video decompression processor described herein takes advantage of the fact that a majority (i.e., approximately 80%) of the data accessed from DRAM 22 is made on rectangular "prediction areas" of pixels. In the illustrated embodiment, each prediction area is nine pixels high by seventeen pixels wide. The use of a prediction area of this size (instead of an 8×16 pixel area corresponding to two 8×8 data blocks) enables subpixel interpolation to be accomplished since one row and one column of pixels is added to a set of two 8×8 pixel blocks. The ratio of height to width (9:17) of the prediction area is approximately 0.53. In order to minimize the number of row crossings necessary when addressing DRAM 22, prior frame data is stored in the DRAM on the basis of tiles that have a similar ratio of height to width (e.g., about 0.50). An allocation of tiles within a video frame that can be used in accordance with the present invention is illustrated in FIG. 2.

Figure 2:
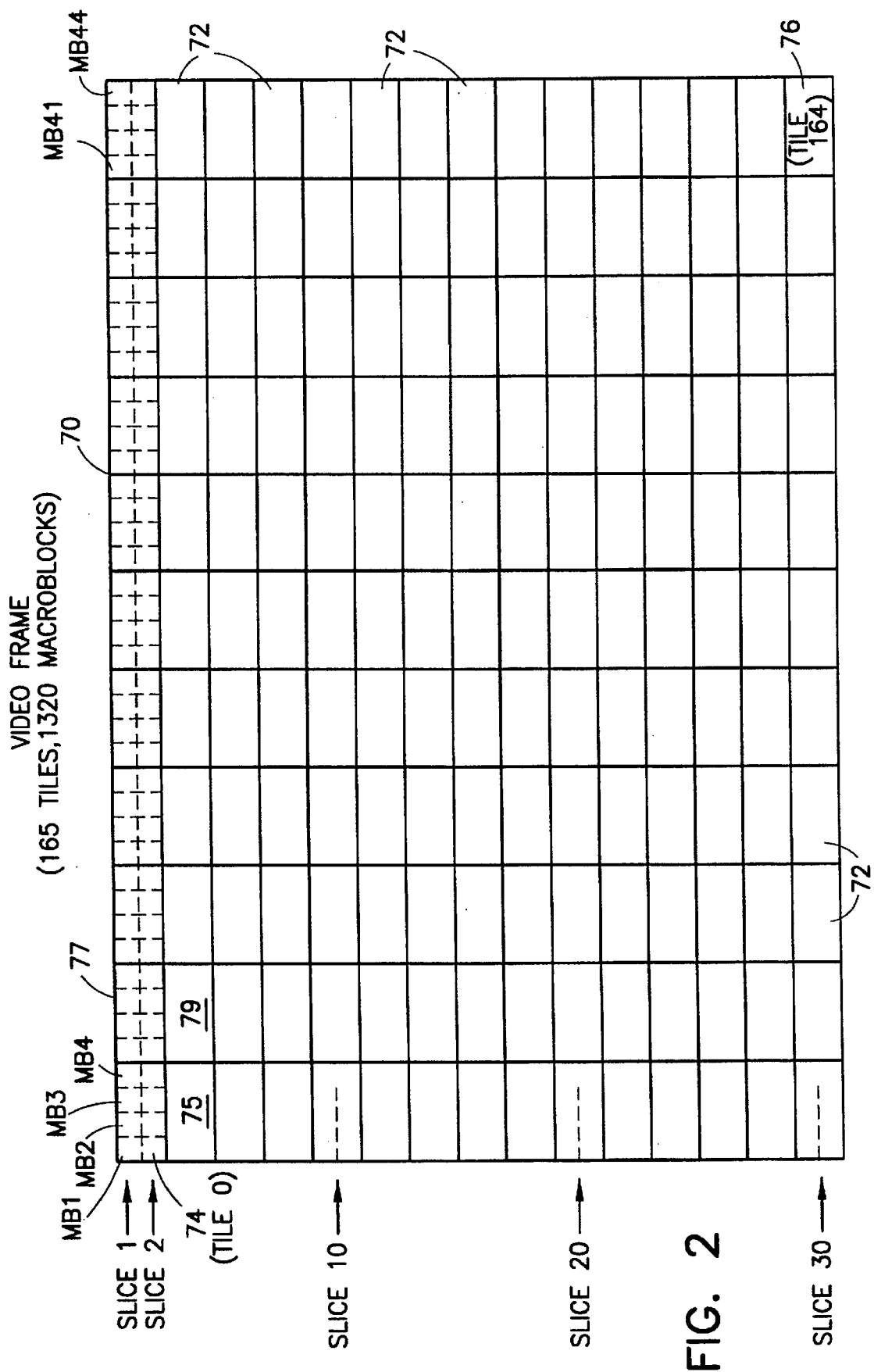
FIG. 2 is a diagrammatic illustration showing how one luminance video frame is divided into pages in accordance with the present invention.

As shown in the example of FIG. 2, a luminance NTSC video frame 70 is divided into 165 "tiles" of equal size. Each tile 72 contains eight macroblocks (MB) in two slices of four macroblocks each. The 165 tiles are organized in an array of fifteen rows, each row containing eleven tiles. Each row contains two slices, for a total of thirty slices within each video frame. Each slice contains 44 macroblocks. Since there are 165 tiles, each containing 8 macroblocks, there a total of 1320 macroblocks in each NTSC video frame. Each luminance macroblock contains four blocks of 8×8 pixels. Each pixel comprises 8 bits of data. The video frame is divided so that each tile will contain the amount of data that can be held in one row of DRAM 22. It should be appreciated that somewhat different specifications will result for other television formats (e.g., PAL or SECAM) using the same fundamental principles.

In the embodiment illustrated, each row of DRAM 22 holds 512 thirty-two bit words for a total of 16,384 bits. Thus, each tile 72 of the video frame should also contain 16,384 bits. Since each macroblock contains four 8×8 luminance blocks, the macroblock comprises 256 eight bit pixels for a total of 2,048 luminance bits per macroblock. Each tile contains eight such macroblocks, for a total of 16,384 luminance bits. Each tile 72 of the luminance video frame illustrated in FIG. 2 therefore maps to one row of DRAM 22.

Figure 3:
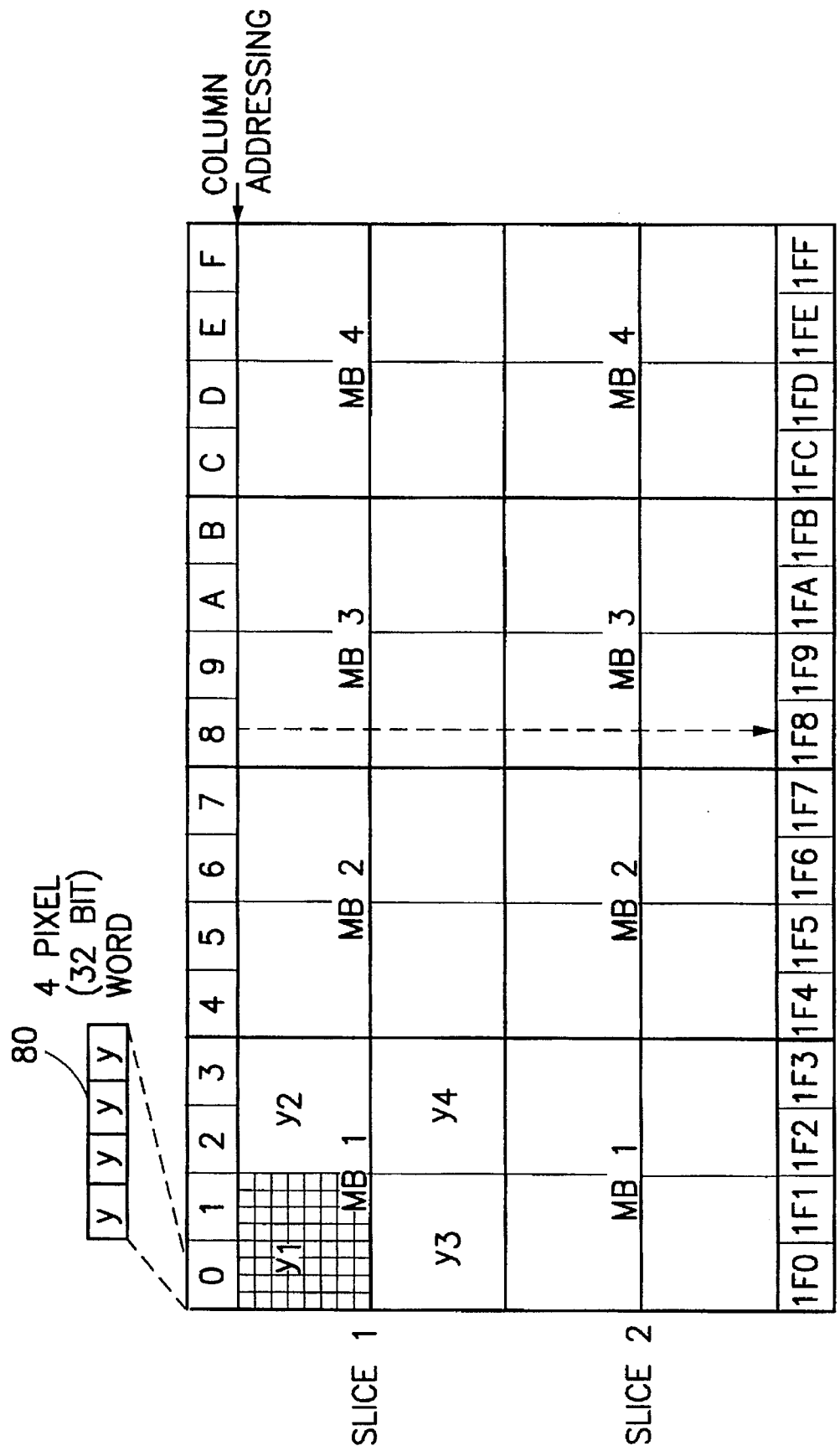
FIG. 3 is a diagrammatic illustration of one luminance page.

FIG. 3 illustrates one luminance tile 72 in greater detail. As shown, the luminance tile comprises portions of two different slices of the video frame. Four macroblocks (each containing four 8×8 luminance blocks) are provided in each slice portion. Since each DRAM location stores one thirty-two bit word, four eight bit luminance pixels (Y) can be stored in each DRAM location as illustrated by the four pixel word 80 in FIG. 3. As previously noted, there are 512 columns in each row of the DRAM, each accessible by one of the hexadecimal RAM addresses 0–1FF.

Figure 4:
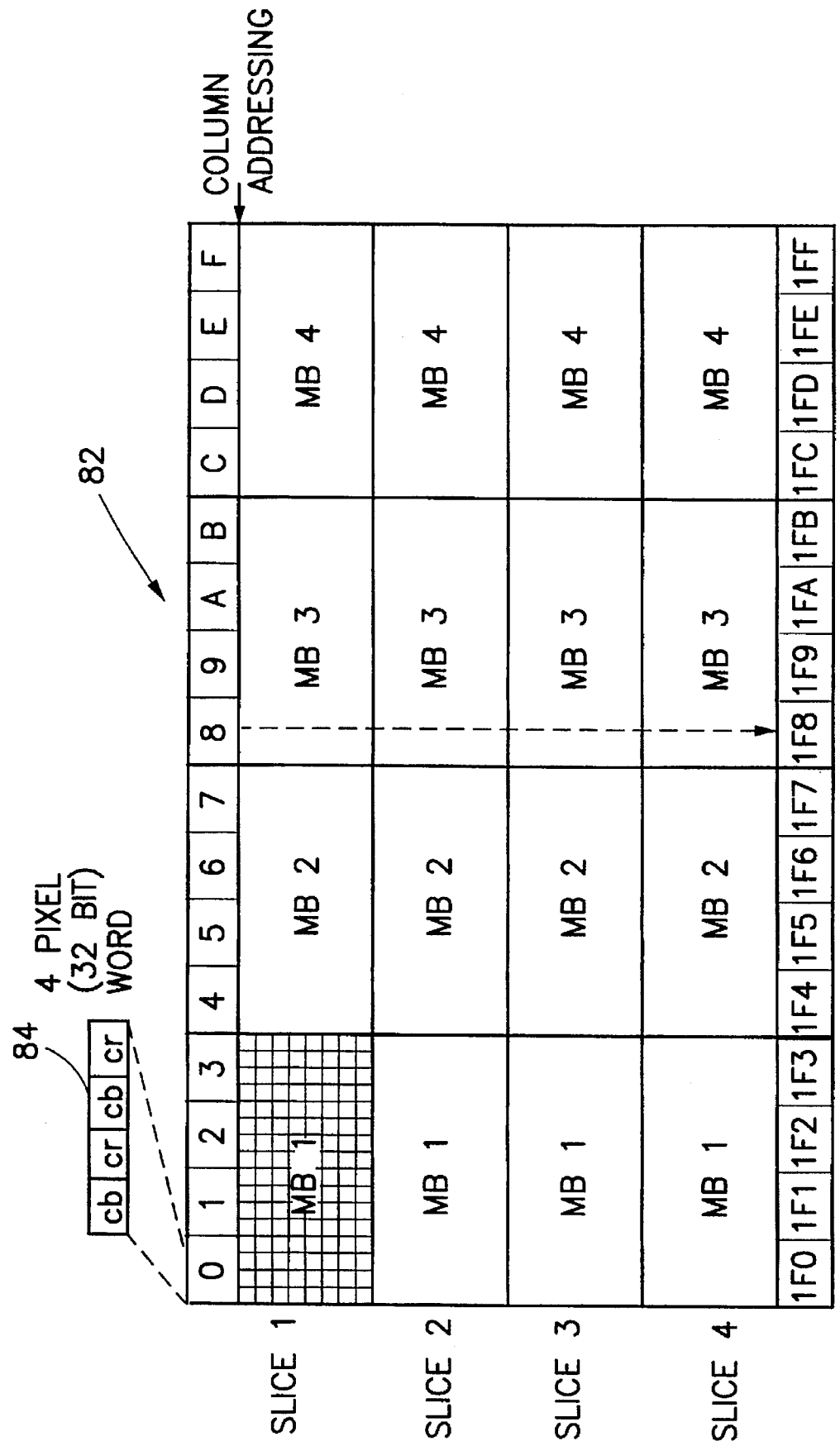
FIG. 4 is a diagrammatic illustration of one chrominance page.

The chrominance data is handled similarly, except that each video frame contains half as much chrominance information as luminance information. Therefore, as illustrated in FIG. 4 each chrominance tile 82 contains portions from four slices of the video frame, each slice portion containing four chrominance macroblocks. The chrominance macroblocks are half the size of the luminance macroblocks, and therefore instead of eight macroblocks per tile, a chrominance tile contains sixteen macroblocks. Like the luminance tiles, each chrominance tile maps to one row of DRAM 22. In a preferred implementation, DRAM 22 is divided into separate areas for storing the luminance data and the chrominance data, with the chroma sections generally one half the size of the luminance sections. As illustrated by the four pixel word 84, the chrominance data is stored as alternating cb and cr chrominance components.

Figure 5:
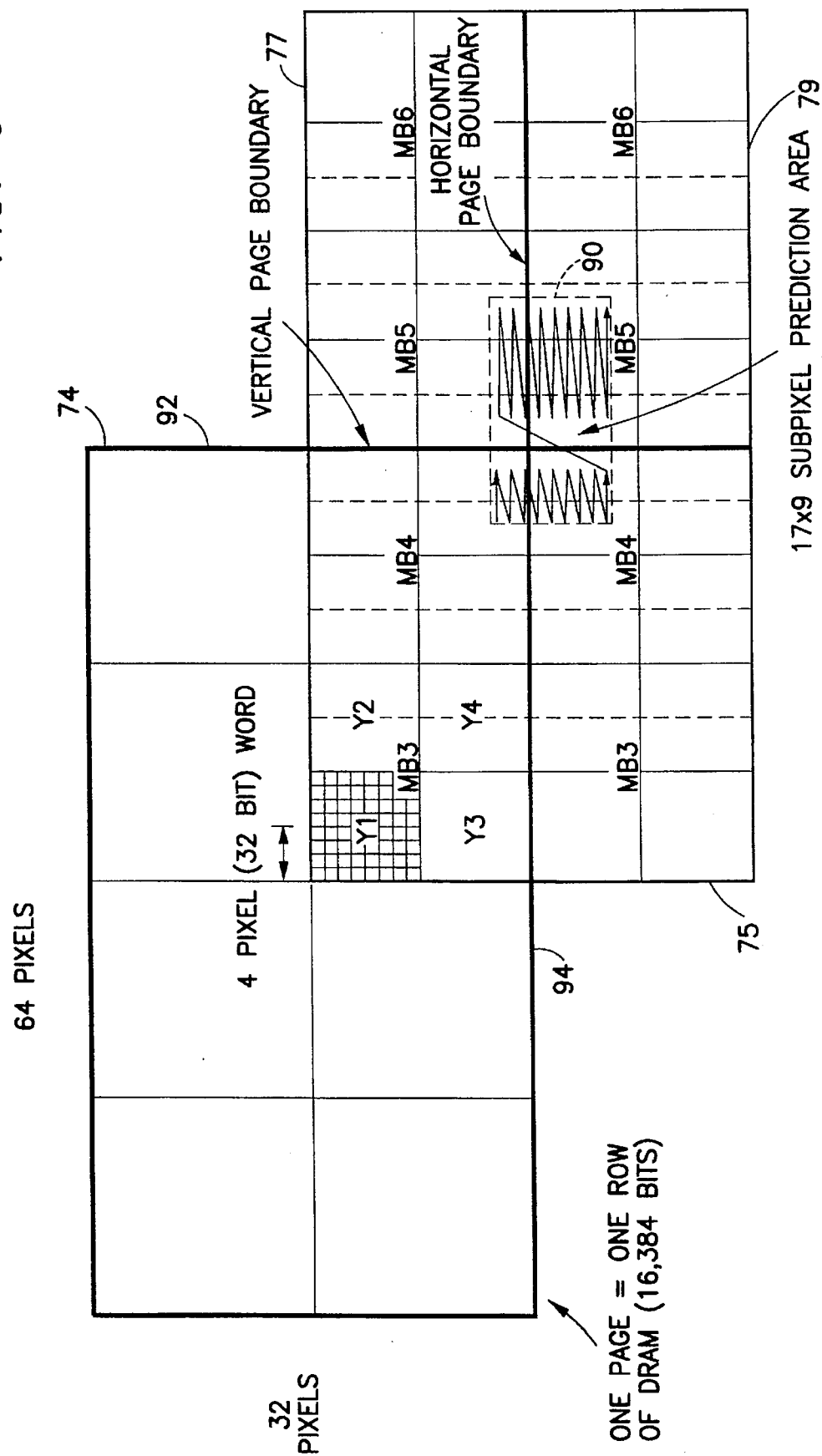
FIG. 5 is a diagrammatic illustration of a worst case condition wherein the reading of data from a prediction area requires four different memory rows to be accessed.

FIG. 5 illustrates how the one tile per row mapping used in accordance with the present invention can minimize the number of memory row address changes necessary in order to read a group of pixels within a prediction area from the DRAM. Portions of the four adjacent tiles 74, 75, 77 and 79 (from the upper left hand corner of video frame 70 of FIG. 2) are illustrated in FIG. 5. For simplicity, all of tile 74 is illustrated in FIG. 5, but only portions of tiles 75, 77 and 79 are shown. The vertical intersection of tiles 74, 75, 77 and 79 is along a vertical "page" boundary 92 of DRAM 22. The horizontal intersection of these tiles is along a horizontal "page" boundary 94 of the DRAM. Since one tile is stored in each row (i.e., "page") of DRAM 22, it is necessary to address a new row of the DRAM each time a vertical or a horizontal page boundary is crossed.

In order to predict the pixel data for a current frame from pixel data of a previous frame stored in DRAM 22, the previous frame pixels will be read from a predetermined prediction area for each group of pixels to be predicted in the current frame. The prediction area for each group of pixels is located using motion vectors transmitted with the compressed video data in a conventional manner. A worst case prediction area 90 is illustrated in FIG. 5. Prediction area 90 represents a worst case scenario because it covers pixels from four different tiles. If this prediction area were to be read, for example, by simply scanning consecutive rows therewithin, it would be necessary to repeatedly cross the vertical page boundary 92, thereby accessing different rows of the DRAM. This would significantly reduce the speed at which the data could be read from the DRAM.

In the embodiment illustrated herein, the prediction area 90 is scanned in a manner which only requires four DRAM row addressing steps, i.e., a new row address is only required once for each of tiles 74, 75, 77 and 79 contained in the prediction area. In order to accomplish this, all of the data from each tile is read before proceeding to the next tile. The particular embodiment illustrated uses a zig-zag scanning pattern commencing at the upper left corner of the prediction area to retrieve all of the data from tile 74 which resides within prediction area 90. Then, the row of DRAM 22 containing tile 75 of the video frame is scanned until all of the data within the prediction area from that tile is retrieved. The DRAM row corresponding to tile 77 is then accessed, and all of the data residing in tile 77 within prediction area 90 is retrieved. Finally, the DRAM row containing tile 79 is accessed and all of the data within prediction area 90 for that tile is retrieved. Thus, instead of repetitively accessing different rows within the DRAM, in the worst case only four DRAM row accesses need to be made for recovering the data from an entire prediction area.

Figure 6:
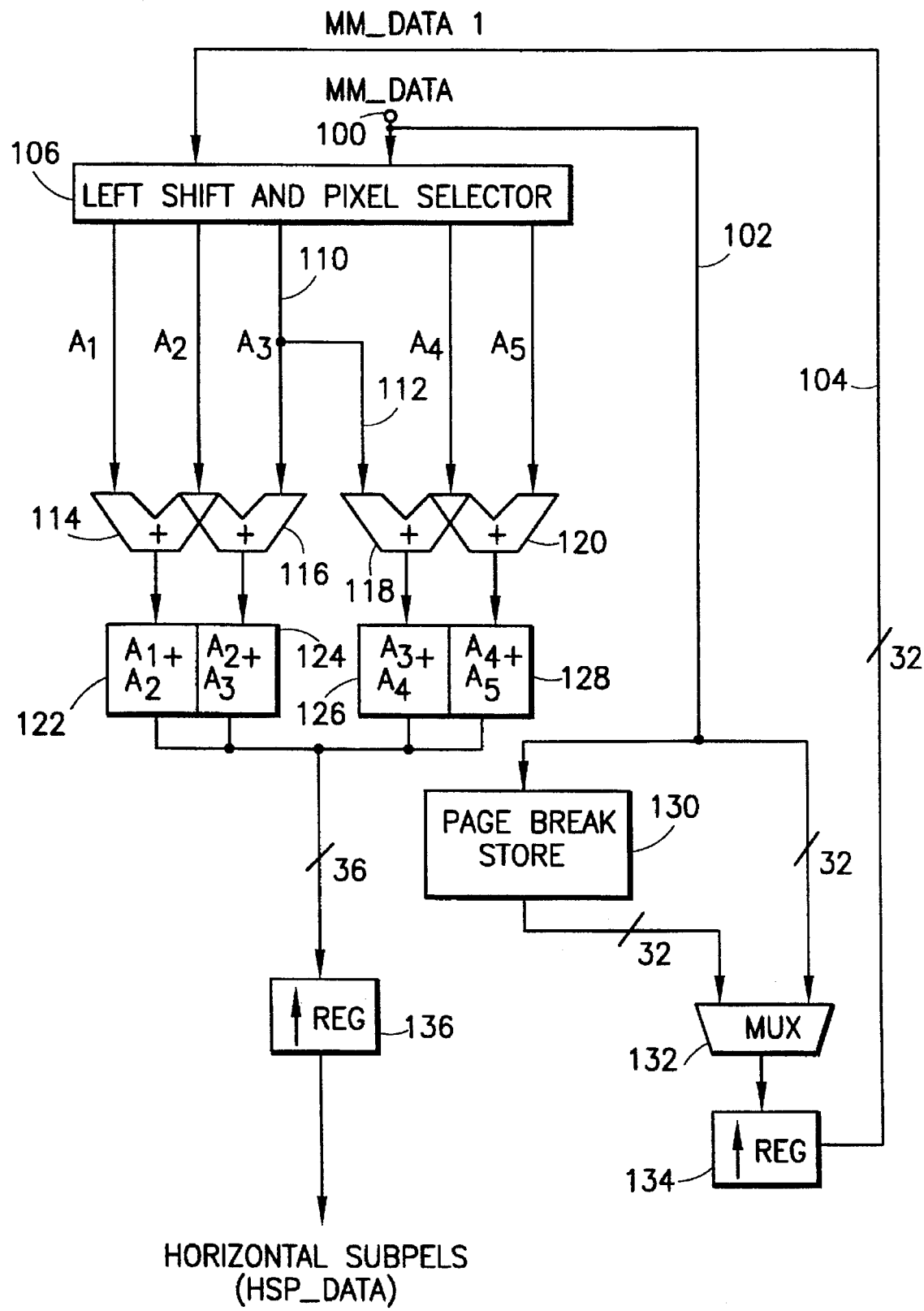
FIG. 6 is a block diagram of a horizontal interpolation filter in accordance with the present invention.

FIG. 6 is a block diagram of a horizontal subpel filter in accordance with the present invention. The filter of FIG. 6 receives pixels from the DRAM that are bounded by the prediction area. Horizontal interpolation of the pixels is provided using in-place computation to the extent possible to reduce the hardware requirements. Adders are provided to add adjacent pixels together for subsequent averaging by dividing by the number of pixels that were summed (e.g., four for diagonal interpolation and two for horizontal or vertical interpolation). The actual division occurs in truncation circuit 150 described below in connection with FIG. 7, with biasing occurring in adders 114, 116, 118, 120 and 148. In particular, prior to the division, a carry input of each adder is used to add a binary "1" to the sum. The least significant bit (÷2) or least significant two bits (÷4) of the sum are then truncated to perform the division and at the same time round the subpixel result away from zero. This novel use of the carry input saves hardware and increases the processing speed of the subpixel filtering.

In the worst case, the MPEG equation for one pixel of prediction is:

$$p=((((a+b)+(c+d))//4)+(((e+f)+(g+h))//4))//2$$

Where // indicates division with rounding to the nearest integer, and half integer values are rounded away from zero. This equation can be rewritten as:

$$p=((((a+b)+(c+d)+2)>>2)+(((e+f)+(g+h)+2)>>2)+1)>>1$$

The last equation can be rewritten as:

$$p=((((a+b+1)+(c+d+1))>>2)+(((e+f+1)+(g+h+1))>>2)+1)>>1$$

The subpixel filter of FIG. 6 uses the final equation above, since adding 1 is much easier than adding numbers greater than 1. When calculating the prediction, it is necessary to round intermediate and final results away from zero. Typically, rounding a signed 2's compliment number away from zero requires a sign check to be performed, followed by a conditional addition followed by a truncation. In the filter of FIG. 6, however, the rounding arithmetic is folded in with the averaging/filtering arithmetic to provide a structure that uses a minimal number of hardware adders. Since the pixel data that is being averaged is always positive, the need for controlling rounding of negative numbers has been eliminated. Thus, only the positive intermediate results need to be rounded. As noted above, the carry in of the adders (i.e., adders 114, 116, 118, 120 and 148) is used to implement the additions of one required by the above equation.

Data from the DRAM 22 of FIG. 1 is routed via memory manager 30 (mm_data) to input terminal 100 of the horizontal subpel filter of FIG. 6. In the simplest case (i.e., when there are no page breaks to contend with and the prediction area commences at the beginning of a new word), the data is read in one word at a time. Each word comprises four pixels. For example, a four pixel luminance word 80 as illustrated in FIG. 3 can be input to terminal 100, or a four pixel chrominance word 84 as illustrated in FIG. 4 can be input. The words that are input are delayed by one clock cycle via a register 134 that receives the mm_data via path 102 and multiplexer 132. The delayed word is then input to a shifter and pixel selector 106. Circuit 106 will output the four pixels from the delayed mm_data word (referred to as mm_data1) together with a first pixel from the current mm_data word input to terminal 100. In a preferred embodiment, the shift function of circuit 106 is provided by a barrel shifter which is configured to shift to the left (i.e., a "left shift") as illustrated.

Where the prediction area does not encompass a vertical page break, the four pixels of each successive word will be stored in order in the shifter portion of circuit 106. Lines 110 and 112 from the shifter each contain the same pixel. This arrangement precludes any need to rearrange the pixels as they are output from shifter 106 to the adders 114, 116, 118 and 120.

In the example shown in FIG. 6, a first word of pixel data contains pixels $A_1, A_2, A_3,$ and $A_4$ (mm_data1). At the same time the delayed word mm_data1 is input to the shifter, the first pixel "$A_5$" of the next word (received via input terminal 100) is input thereto. Left shift and pixel selector circuit 106 stores pixel $A_5$ in the last cell of its shifter portion. As each successive four pixel word arrives at terminal 100, the first pixel of that word will be stored in the last cell of the shifter, while the four pixels from the previous word (delayed by register 134) are loaded into the first four cells of the shifter. Thus, it is possible to successively process five pixels at a time, to provide four interpolated subpels during each clock cycle after the first word from the prediction area has been input.

The first step necessary to average the pixels provided from left shift and pixel selector circuit 106 is performed by adders 114–120. As illustrated in FIG. 6, when shifter circuit 106 contains pixels $A_1$–$A_5$, adder 114 will compute the sum of pixels $A_1$ and $A_2$ as indicated at 122. Adder 116 will compute the sum of pixels $A_2$ and $A_3$ as indicated at 124. Adder 118 will compute the sum of pixels $A_3$ and $A_4$ as indicated at 126. Adder 120 will compute the sum of pixels $A_4$ and $A_5$ as indicated at 128.

Each of adders 114–120 is a conventional digital adder having a carry input (not shown) as well known in the art. The present invention makes novel use of the carry input by actuating it for each addition in order to add one to the sum of the pixels input to the adder. In order to complete the averaging of the two pixels, the least significant bit of the sum is truncated (after the carry-in is used to add a binary "1"). The truncation after the addition of a binary "1" serves to round the average away from zero. The truncation can be performed directly after the adders 114–120 in FIG. 6, or subsequently as discussed below in connection with FIG. 7.

Figure 8:
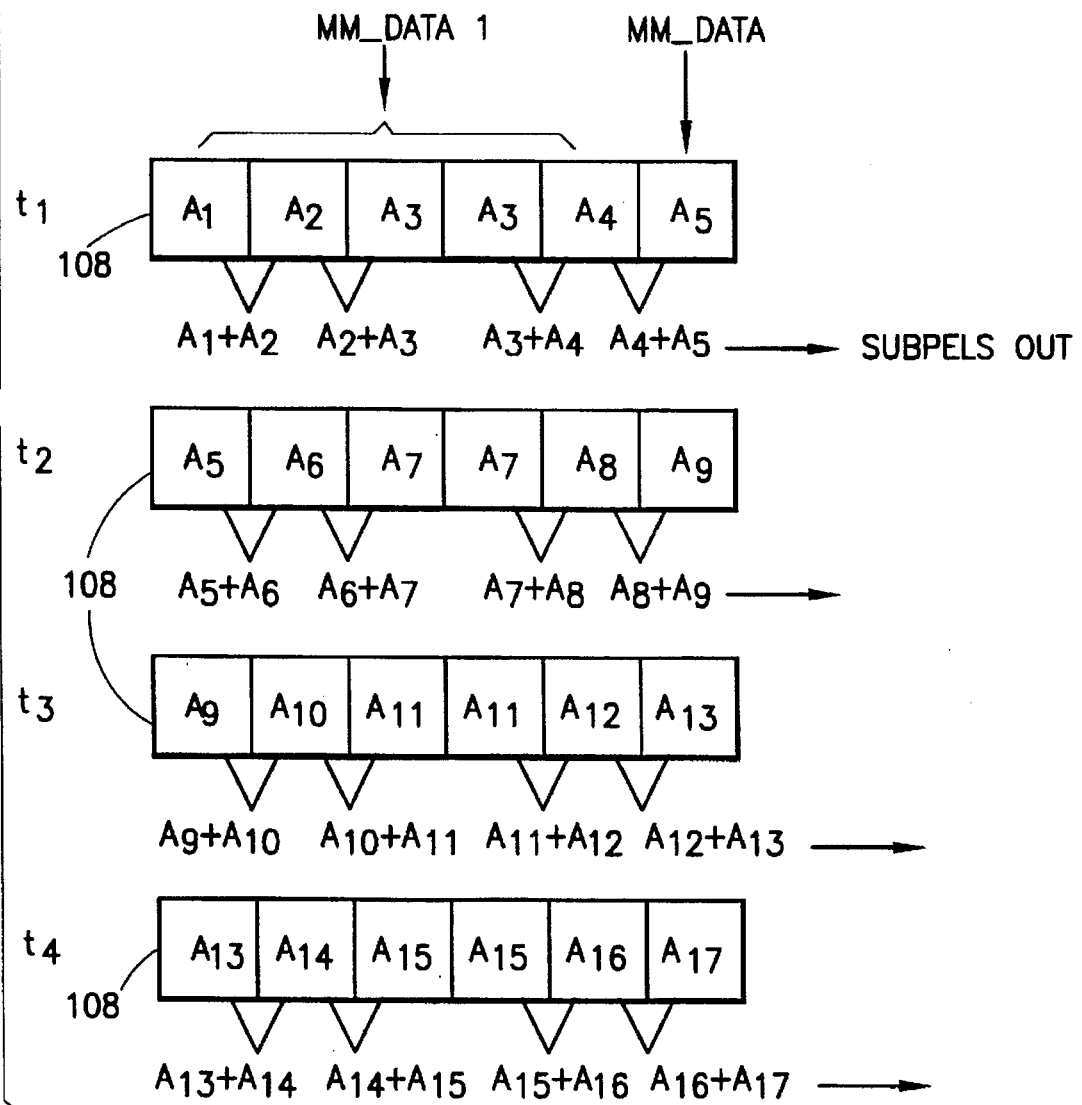
FIG. 8 is a diagrammatic illustration of the operation of the horizontal subpel filter of FIG. 6 in a situation where a prediction area has no vertical page break.

The operation of the horizontal subpel filter of FIG. 6 through four successive cycles is illustrated in FIG. 8 for the case where there is no page break in the prediction area. As illustrated in FIG. 8, a prediction area 160 bounds an area that is seventeen pixels wide by nine pixels high. This is equivalent to two 8×8 blocks, with an additional row and an additional column added for horizontal and vertical interpolation. Normally, the reading of pixels from the prediction area 160 will commence at the upper left corner of the prediction area (i.e., with pixel $A_1$). The pixels are then read in words of four pixels, horizontally. Where, as illustrated, the prediction area commences at the beginning of a word boundary (i.e., all of the pixel values from the first word encountered within the prediction area are valid), the whole word will be input to the left shift and pixel selector circuit 106. As shown in FIG. 8, the first word read comprises pixels $A_1, A_2, A_3$ and $A_4$. These pixels are input to selector 106 at time $t_1$, as illustrated. Time $t_1$ is one cycle after the commencement of the reading of data from prediction area 160. During the previous cycle ($t_0$), the first word ($A_1, A_2, A_3, A_4$) would have been read in and delayed by one cycle by register 134. Thus, at cycle $t_1$, this first word is provided to selector 106 as mm_data1. The word currently being read from prediction area 160 is the word comprising pixels $A_5$, $A_6$, $A_7$ and $A_8$. This word comprises the current mm_data and the first pixel thereof (i.e., $A_5$) is input to the least significant bits of selector 106. The adders then compute the averages $A_1+A_2$, $A_2+A_3$, $A_3+A_4$, and $A_4+A_5$. These sums, after rounding and truncation comprise the horizontally interpolated subpels which are output from the horizontal subpel filter (assuming that truncation is performed in the horizontal subpel filter itself).

At time $t_2$, the mm_data1 will comprise pixels $A_5, A_6, A_7$, end $A_8$. The mm_data will comprise pixels $A_9, A_{10}, A_{11}$ and $A_{12}$. At this point, only pixel $A_9$ of the mm_data is input to selector 106. The adders compute the sums $A_5+A_6$, $A_6+A_7$, $A_7+A_8$, and $A_8+A_9$. Similarly, during cycle $t_3$ the pixels $A_9, A_{10}, A_{11}, A_{12}$ and $A_{13}$ are horizontally interpolated. At cycle $t_4$, pixels $A_{13}$, $A_{14}$, $A_{15}$, $A_{16}$ and $A_{17}$ are horizontally interpolated. The process continues until all of the pixels within the prediction area 120 have been interpolated. More particularly, after all of the pixels in the first row ($A_1$–$A_{17}$) have been interpolated, the pixels in the next row ($B_1$–$B_{17}$) will be interpolated, then the C, D, . . . I pixels will be interpolated until the entire prediction area has been processed.

Figure 9:
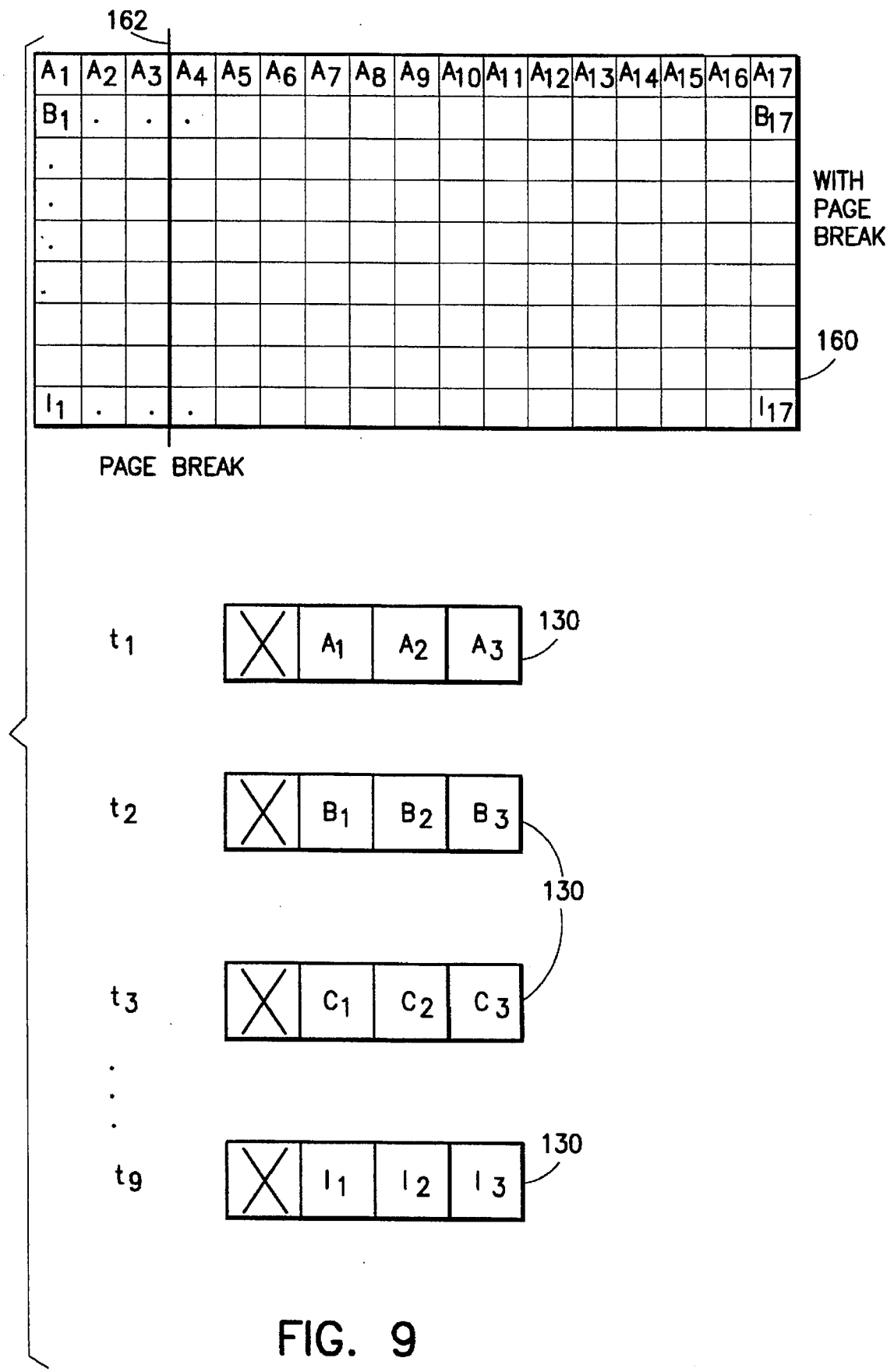
FIGS. 9 and 10 are diagrammatic illustrations of the operation of the horizontal subpel filter of FIG. 6 in a situation where a prediction area includes a vertical page break.
Figure 10:
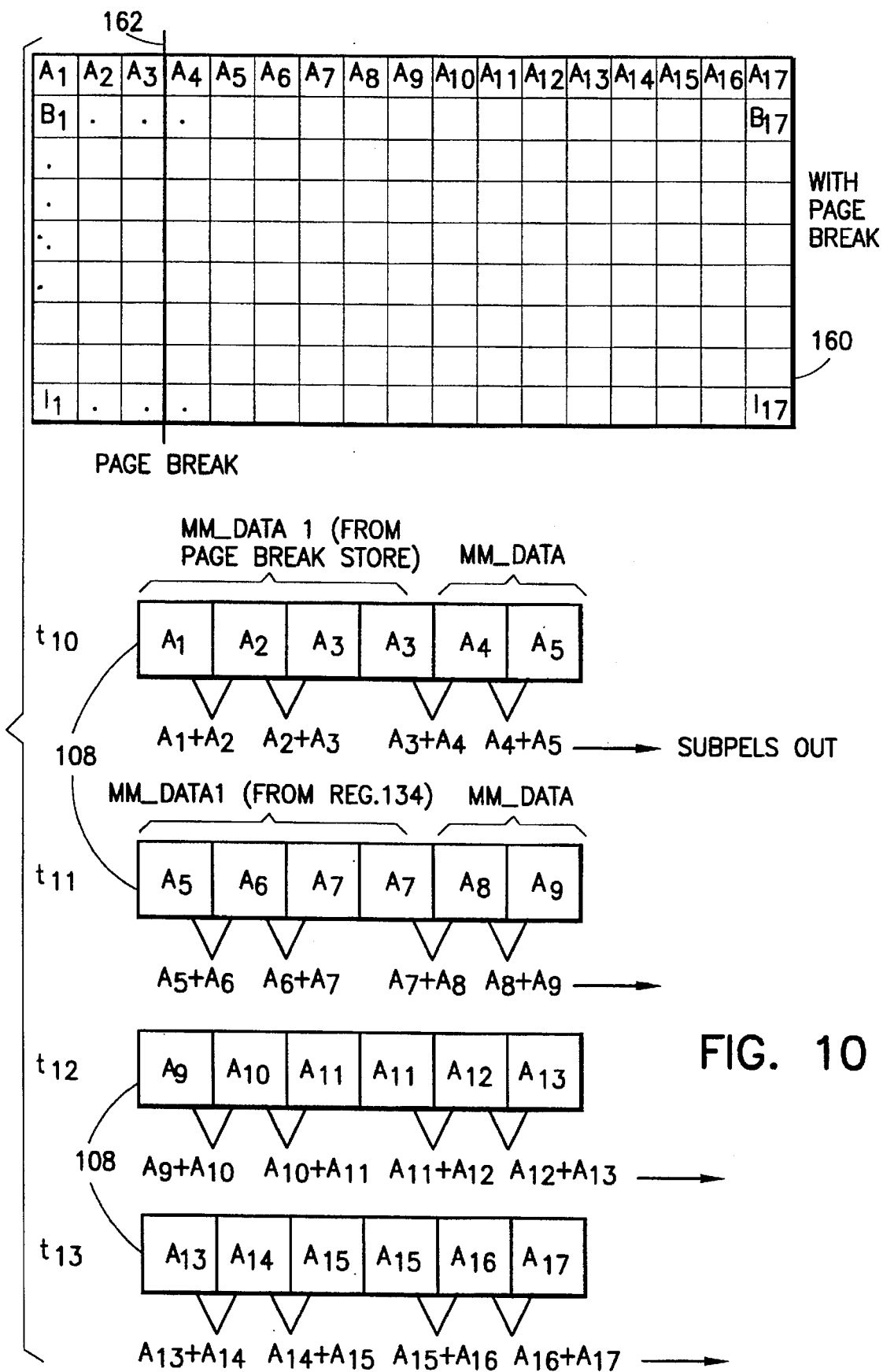

FIGS. 9 and 10 illustrate a more complicated situation in which prediction area 160 encompasses a vertical page break 162. As noted in connection with the discussion of FIG. 5, a prediction area encompassing a page break will be scanned one page at a time to minimize the number of row changes that must be made when addressing the DRAM 22. Thus, in FIGS. 9 and 10 pixels $A_1$–$A_3$ will be read, followed by pixels $B_1$–$B_3$, and then pixels $C_1$–$C_{13}$, . . . $I_1$–$I_3$ will be read. Thereafter, pixels $A_4$–$A_{17}$ will be read, followed by pixels $B_4$–$B_{17}$, . . . and finally pixels $I_4$–$I_{17}$.

The interpolation filter of FIG. 6 includes a 9×32 register file (e.g, dual port memory) 130 for storing the nine words of pixel data immediately preceding a page break. In the illustration of FIGS. 9 and 10, only the last three pixels (e.g., $A_1, A_2$ and $A_3$) of each word immediately prior to the page break are within the prediction area. However, page break store 130 must be large enough to accommodate nine full words in the event that the page break is preceded by four full pixels in each row of the prediction area. Multiplexer 132 selects either the mm_data from terminal 100 or the data immediately proceeding the page break from page break store 130, depending on whether or not pixels immediately after the page break (e.g, pixels $A_4$–$A_7$) are currently being processed.

Referring now to FIGS. 9 and 10, during cycle $t_1$ pixels $A_1, A_2$ and $A_3$ will be loaded into page break store 130 for subsequent use when data from the right side of page break 162 is being interpolated. This will enable pixel $A_1$ to be averaged with pixel $A_2$ and pixel $A_2$ to be averaged with pixel $A_3$. It will also enable pixel $A_3$ to be averaged with pixel $A_4$. During cycle $t_2$, pixels $B_1$, $B_2$ and $B_3$ are stored in page break store 130. During cycle $t_3$, pixels $C_1$, $C_2$ and $C_3$ are stored in page break store 130. This loading of the page break store continues for all of the relevant pixels within the prediction area to the left of the page break 162 until cycle $t_9$, when pixels $I_1$, $I^2$, and $I_3$ are loaded.

After all of the pixels preceding page break 162 have been temporarily stored, processing of the pixels to the right of the page break can commence. At cycle $t_{10}$, illustrated in FIG. 10, pixels $A_1$–$A_3$ are input to shifter 106. More particularly, pixels $A_1$–$A_3$ will be obtained from page break store 130 (via multiplexer 132 and register 134) and are input to left shift and pixel selector circuit 106 as mm_data1. These pixels are then output to adders 114, 116 and 118. At the same time, left shift and pixel selector circuit 106 will receive the current mm_data comprising pixels $A_4$ and $A_5$ for output to adders 118 and 120, as illustrated. Thus, at cycle $t_{10}$ pixel $A_1$ can be horizontally averaged with pixel $A_2$, pixel $A_2$ can be horizontally averaged with pixel $A_3$, pixel $A_3$ can be horizontally averaged with pixel $A_4$, and pixel $A_4$ can be horizontally averaged with pixel $A_5$.

At cycle $t_{11}$, pixels $A_5$, $A_6$, and $A_7$ will be input to the shift and pixel selector circuit 106 as mm_data1 via register 134. These pixels are merely delayed by one clock cycle in register 134, and are not obtained from page break store 130 as were pixels $A_1$, $A_2$, and $A_3$ from the left of the page break. Concurrently, the first two pixels of the current mm_data (i.e., pixels $A_8$ and $A_9$) are input to the last cell of shifter 106. This enables these pixels to be horizontally interpolated.

During cycles $t_{12}$ and $t_{13}$, the remaining "A" pixels in the first row of the prediction area 160 are horizontally interpolated. Thereafter, the remaining pixels in each of the "B", "C", ... and "T" rows of the prediction area will be averaged in the same manner.

Figure 7:
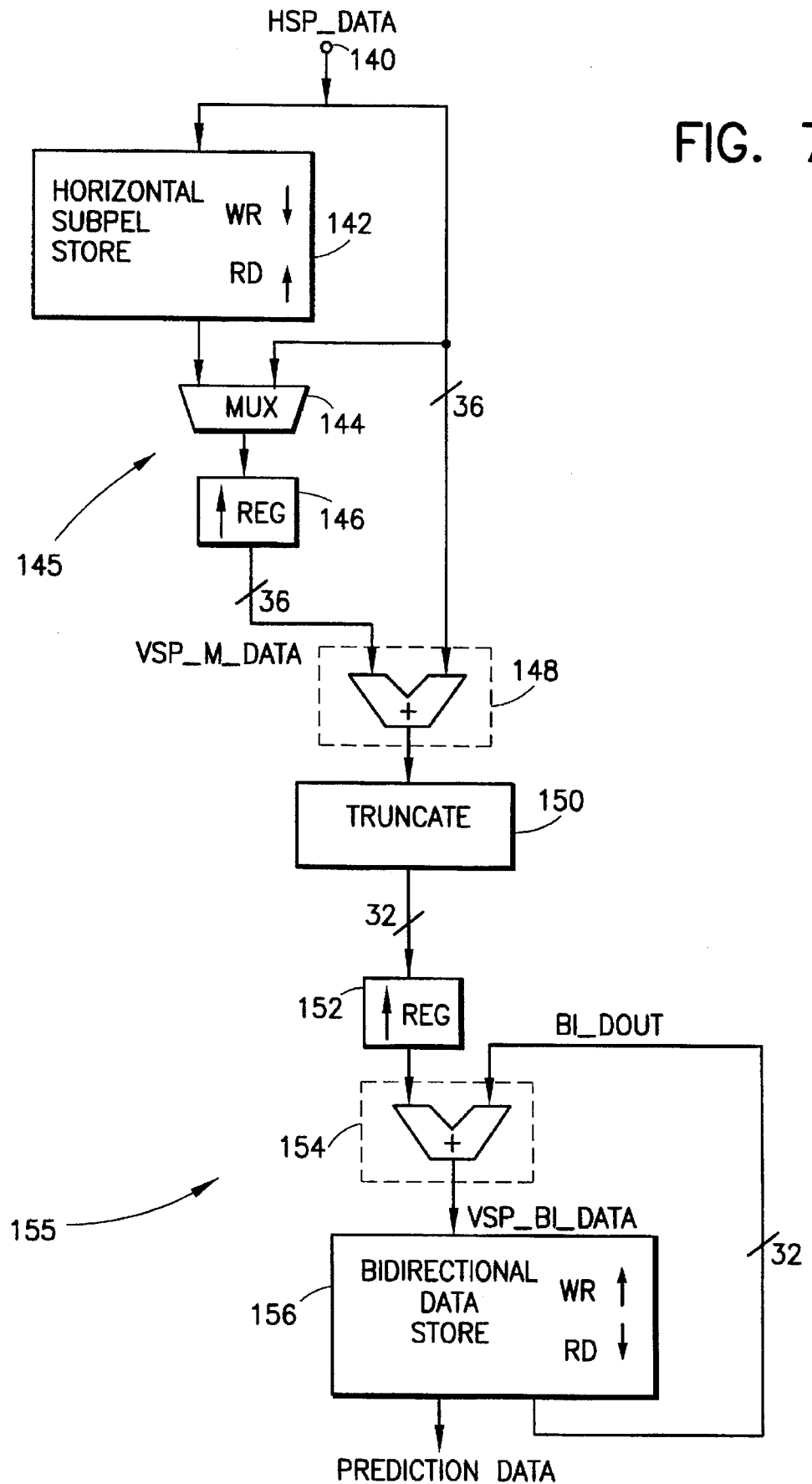
FIG. 7 is a block diagram of a filter for providing vertical and bidirectional interpolation in accordance with the present invention.

While each row is being horizontally interpolated by the filter of FIG. 6, the interpolated subpels thereof can be vertically interpolated by the filter of FIG. 7. The horizontal subpel data (hsp_data) is input via terminal 140 to the vertical interpolation filter, generally designated 145, as soon as it is obtained. One row at a time of horizontal subpel data is stored in a 4×36 register file (e.g, dual port memory) 142 for use in averaging each word of that row with a subsequent vertically displaced word of subpel data. When a word from the subsequent row arrives, it is averaged in adder 148 (comprising four separate adders similar to adders 114, 116, 118 and 120 shown in FIG. 6) with the subpels of the previous counterpart word which is output from horizontal subpel store 142 and delayed by one clock cycle via register 146.

A multiplexer 144 (used as a selector) is provided to handle a special situation where a vertical page break within the prediction area is preceded by just one word (i.e., four subpels or less) in each row of the prediction area. Due to timing considerations, a word (e.g., subpels $A_{1+2}$, $A_{2+3}$, $A_{3+4}$, $A_{4+5}$) is not written into horizontal subpel store 142 when the immediately following word (e.g., subpels $B_{1+2}$, $B_{2+3}$, $B_{3+4}$, $B_{4+5}$) is to be averaged with it. Instead, the first word is directly stored in register 146 via terminal 140 and multiplexer 144, so that it can be summed at the next clock cycle with the immediately following word in adder 148, without having to pass through horizontal subpel store 142. Multiplexer 144 is able to select a subpel either from the incoming hsp_data as indicated above or from horizontal subpel store 142. The selected subpel is held in register 146 until the next clock cycle, when it is provided as an input (vsp_m_data) to adders 148.

Figure 11:
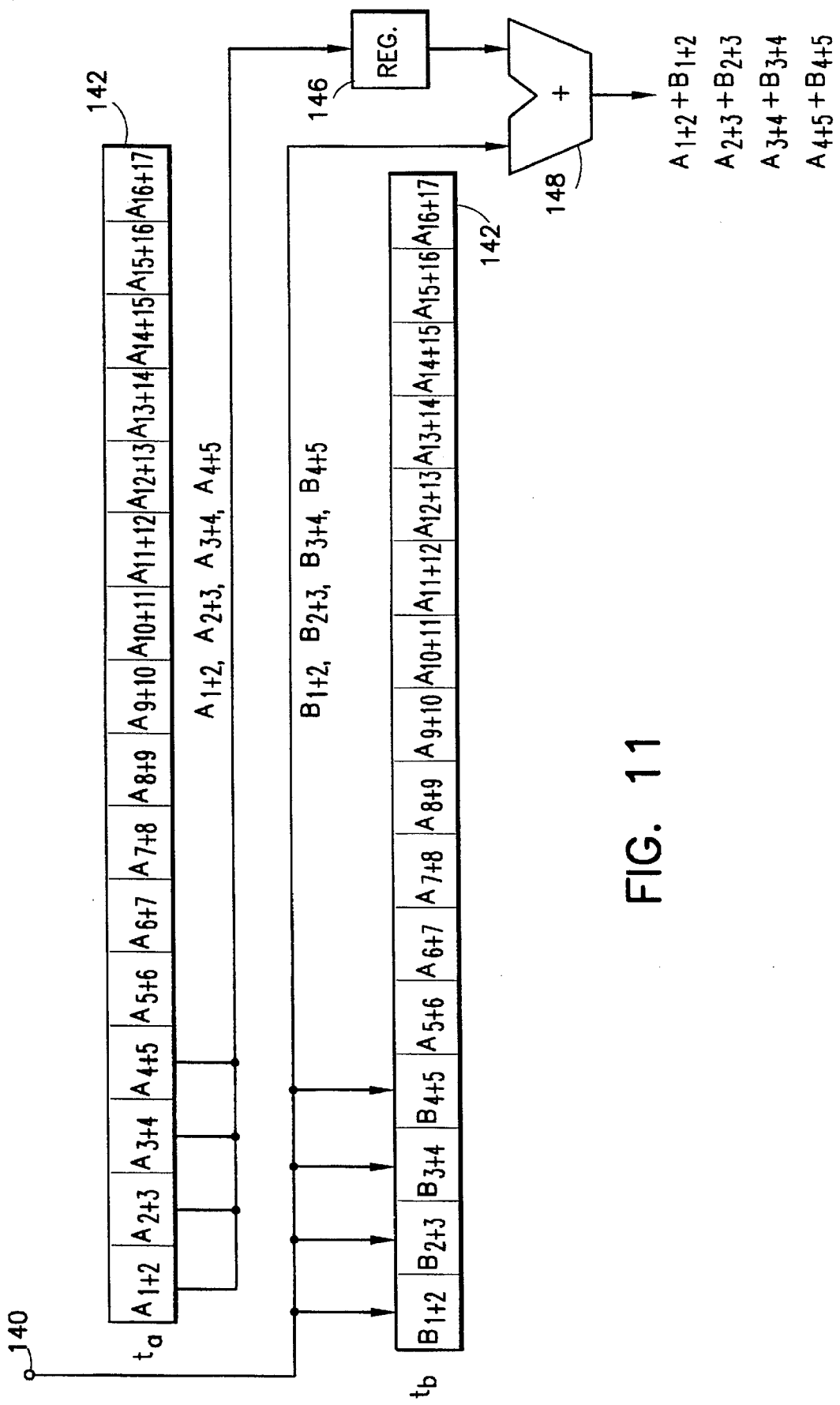
FIG. 11 is a diagrammatic illustration of the operation of the vertical subpel filter of FIG. 7.

The operation of the vertical subpel filter over two cycles is illustrated diagrammatically in FIG. 11. This figure shows the horizontal subpel store 142 at two different points in time, $t_a$ and $t_b$. At time $t_a$, the horizontal subpel store has been loaded with the subpels from an entire row of the prediction area. The subpel $A_{1+2}$ indicates the subpel derived by interpolating pixel $A_1$ and pixel $A_2$ as illustrated, e.g., at time $t_1$ in FIG. 8. As each of the four subpels from a word in the next row (the B row) is being generated, it is simultaneously averaged with the counterpart subpel from the prior row (the A row) in adder 148.

For example, at time $t_b$, the first word of B subpels ($B_{1+2}$, $B_{2+3}$, $B_{3+4}$ and $B_{4+5}$) has been computed by the horizontal interpolation filter of FIG. 6 and output from register 136 to terminal 140 of the vertical interpolation filter of FIG. 7. These four subpels are immediately input to horizontal subpel store 142, where they overwrite subpels $A_{1+2}$, $A_{2+3}$, $A_{3+4}$ and $A_{4+5}$ which by this point have been temporarily stored in register 146. At the same time, subpels $B_{1+2}$, $B_{2+3}$, $B_{3+4}$ and $B_{4+5}$ are directly input to associated inputs of adder 148 while subpels $A_{1+2}$, $A_{2+3}$, $A_{3+4}$ and $A_{4+5}$ are input from register 146 to their respective inputs of adder 148. It should be remembered that adder 148 actually comprises four separate adders; one for each of the four subpels (one word) to be produced at a time.

Adder 148 produces the sum of subpels $A_{1+2}$ and $B_{1+2}$; $A_{2+3}$ and $B_{2+3}$; $A_{3+4}$ and $B_{3+4}$; and $A_{4+5}$ and $B_{4+5}$. This is the resultant vertical interpolation of the horizontally interpolated A and B subpels for one word. During a next cycle (not shown), the next word of B subpels (i.e., $B_{5+6}$, $B_{6+7}$, $B_{7+8}$ and $B_{8+9}$) will arrive at terminal 140 and will overwrite the corresponding word of A subpels ($A_{5+6}$, $A_{6+7}$, $A_{7+8}$ and $A_{8+9}$) in horizontal subpel store 142 at the same time they are added to the corresponding A subpels by adder 148. The process continues with the vertical interpolation occurring concurrently with the provision of each word of B subpels, which is written into horizontal subpel store 142 for subsequent use when computing the averages of the B and C subpels.

The same process continues throughout the prediction area to provide horizontal and vertical interpolation on groups of successive words with the required averaging and associated calculations being performed on the data as the data is being read from the DRAM 22. The implementation illustrated allows horizontal and vertical interpolation to be achieved using a minimum of hardware. For instance, horizontal subpel store only needs to hold one row of subpels from a prediction area. It can therefore be economically implemented in a relatively small, 4×36 register file.

It is noted that in the implementation illustrated in FIGS. 6 and 7, truncation of the sums output from the horizontal adders 114–120 and the vertical adders 148 has not yet occurred. Thus, the four eight-bit subpels of each word are still carrying the binary "1" added by the carry inputs of the adders 114–120 and/or 148. The subpels are therefore each nine bits in length, and each word is thirty-six bits prior to truncation where only horizontal or vertical interpolation has occurred. Where both horizontal and vertical interpolation have been provided, each subpel will be ten bits, for a total of forty bits per word. Thereafter, the words are truncated by a conventional truncation circuit 150 to delete the one or two least significant bits of each subpel. Thirty-two bit words of horizontally and/or vertically interpolated pixel data will then be output from truncation circuit 150.

Bidirectional interpolation can be provided using a bidirectional interpolation filter 155. The subpels output from the vertical interpolation filter for an I or P frame macroblock portion (e.g., two blocks of 8×8 subpels each) are input to a register 152 of the bidirectional interpolation filter and averaged with counterpart subpels from a corresponding P or I frame in adders 154. The resultant anchor frame subpel data is stored in a bidirectional data store 156 which can comprise, for example, a 64×32 register file which is large enough to accommodate a full macroblock of luminance or chrominance data (but not both). The stored interpolated anchor frame data can be used for either special, dual prime or bidirectional mode prediction in accordance with the DCII and/or MPEG-2 compression standard.

In operation, the truncated vertically and horizontally interpolated subpels from truncation circuit 150 are temporarily stored, one at a time, in register 152 for subsequent averaging of counterpart I and P frame subpels in adder 154. In an example implementation, an 8×16 block of subpels can be stored in bidirectional data store 156 from, e.g., an I frame. When the counterpart 8×16 block of subpel data from the necessary P frame is available in register 152, the I frame block is read out of bidirectional data store 156 and fed back to adder 154 where the P and I portions are averaged. The resultant average (vsp_bi_data) is immediately stored in bidirectional data store 156 in the same location from which the I data (bi_dout) was just read. This process continues for a whole 8×16 block of subpel data at a time, while the averages for the prior 8×16 block are stored in bidirectional data store 156. The averaged I and P subpels can then be read from bidirectional data store 156 as the prediction data necessary to reconstruct a B-frame. In the event that B-frames are not to be processed, the horizontally and/or vertically interpolated data can be read out from data store 156 without feeding any bi_dout data back to adder 154.

It should be noted that when chrominance data is being processed by the filters of FIGS. 6 and 7, an additional step must be performed by the left shift and pixel selector circuit 106. In particular, it is preferable to store the chroma data as interlaced $c_r$ and $c_b$ pixels. Such storage is optimal for retrieval of the chroma data from the DRAM when it is time to display the reconstructed video. However, the chroma pixels cannot be interlaced at the time of prediction calculation. Therefore, left shift and pixel selector 106 deinterlaces the chroma data such that it can pass through the same horizontal subpixel averaging hardware (FIG. 6) that is utilized for the luminance data.

It should now be appreciated that the present invention provides a method and apparatus for interpolating between pixels in a video decompression processor. The interpolation is performed using in-place computation to avoid the need to read all of the pixels from a prediction area for processing together, at one time. Instead, the pixels are processed as groups of successive words, with the required averaging and associated calculations being performed on the data as the data is being read. Rather than waiting for all of the data to be read in, the method and apparatus of the present invention read and filter the data concurrently. All of the available clock cycles are used, resulting in a very economical design.

The amount of memory necessary to implement the present invention is also minimized. Of key importance is the use of page break store 130 to maintain a copy of, e.g., the right-most column of pixels prior to a page break and the provision of the horizontal subpel store 142 in order to maintain a copy of the prior row of subpels or pixels necessary for vertical interpolation. Also important is the provision of the bidirectional data store 156 for holding the prediction from one direction (when doing bidirectional interpolation) after which its contents are averaged with a prediction from the other direction.

Although the invention has been described in connection with a preferred embodiment thereof, those skilled in the art will appreciate that numerous adaptations and modifications may be made thereto without departing from the spirit and scope of the invention as set forth in the claims.

What is claimed is:

1. A method for interpolating pixel data provided in multi-pixel words arranged in rows of a video frame, comprising the steps of:

(a) selecting a first set of at least one of said words to be interpolated from a row of said video frame;

(b) interpolating the pixel data for each word in said set in an interpolation direction defined by said row;

(c) temporarily storing the interpolated pixel data for said first set of words in a memory;

(d) selecting a subsequent set of at least one of said words to be interpolated from a next successive row of said video frame, said subsequent set of words being located adjacent said first set of words such that each word of said subsequent set has a counterpart word in said first set;

(e) interpolating the pixel data for a word in said subsequent set in said interpolation direction;

(f) reading from said memory the interpolated pixel data for the word in said first set that is the counterpart of the interpolated word from said subsequent set; and (g) averaging the interpolated pixel data read from said memory with its counterpart interpolated pixel data from said subsequent set while concurrently storing the latter in said memory in place of the former.

2. A method in accordance with claim 1 wherein steps (e), (f) and (g) are performed for successive words in said subsequent set until all of the words in said subsequent set have been interpolated, averaged, and stored in said memory to replace the interpolated data for said first set of words.

3. A method in accordance with claim 1 comprising the further step of truncating the averaged interpolated pixel data.

4. A method in accordance with claim 1 comprising the further steps of:

selecting successive sets of words to be interpolated from successive rows of said video frame, each successive set of words being located adjacent the set of words selected in the previous row such that each word of each successive set has a counterpart word in the immediately preceding set;

interpolating the pixel data for a word in a current successive set in said interpolation direction;

reading from said memory the interpolated pixel data for the word in the immediately preceding set that is the counterpart of the interpolated word from said current successive set;

averaging the interpolated pixel data read from said memory with its counterpart interpolated pixel data from said current successive set while concurrently storing the latter in said memory in place of the former; and performing the preceding interpolating, reading and averaging steps for successive words in each successive set until all of the words in a desired area of said video frame have been interpolated, averaged, and cycled through said memory.

5. A method in accordance with claim 4 comprising the further steps of:

defining a prediction area of said video frame from which pixel data is to be interpolated;

determining if said prediction area encompasses pixel data from more than one page of a frame store in which said video frame is stored; and in the event that said prediction area encompasses pixel data from more than one page of said frame store, selecting said first, subsequent and successive sets of words to be interpolated such that all of the pixel data in said prediction area from a first page of said frame store is interpolated before the pixel data from a subsequent page of said frame store is interpolated.

6. A method in accordance with claim 5 comprising the further steps of:

temporarily storing pixel data adjacent a page boundary of a previously interpolated page of said frame store in a separate memory to enable the interpolation of pixel data residing adjacent said page boundary in a current page of said frame store without crossing said page boundary.

7. A method in accordance with claim 6 wherein pixel data is interpolated for a prediction area of at least two anchor frames, comprising the further steps of:

temporarily storing the interpolated pixel data for one of said anchor frames in a bidirectional data store while interpolating the pixel data for the other of said anchor frames;

averaging the temporarily stored interpolated pixel data from said bidirectional data store with the interpolated pixel data for the other of said anchor frames as the latter is being interpolated; and writing the averaged anchor frame interpolated pixel data into said bidirectional data store for subsequent use in decoding a bidirectional (B) picture.

8. A method in accordance with claim 7 wherein said averaged anchor frame interpolated pixel data is written into said bidirectional data store in place of the anchor frame interpolated data that was read therefrom.

9. A subpixel interpolation filter for a video motion estimation processor comprising:

means for generating a first set of N subpels by averaging adjacent pixels contained in a first vector of (N+1) pixels within a row of a prediction area;

means for temporarily storing said first set of subpels;

means for generating a second set of N subpels by averaging adjacent pixels contained in a second vector of (N+1) pixels from a subsequent row of said prediction area, said second vector in said subsequent row being the counterpart of said first vector in said first row; and means for averaging each subpel from said stored first set of subpels with a counterpart subpel from said second set as the counterpart subpels in said second set are being generated, to obtain a third set of subpels representative of said pixel data interpolated in two dimensions.

10. A subpixel interpolation filter in accordance with claim 9 comprising means for storing each subpel from said second set in said storing means in place of its counterpart subpel from said first set at the same time the second set subpel is being averaged with its counterpart first set subpel by said averaging means.

11. A subpixel interpolation filter in accordance with claim 9 further comprising:

means for determining when said prediction area encompasses pixel data from more than one page of a frame store in which the pixels being interpolated are stored; and means responsive to said determining means for successively selecting vectors of pixels to be interpolated from successive rows within said prediction area such that all of the pixel data in said prediction area from a first page of said frame store is interpolated before the pixel data from a subsequent page of said frame store is interpolated, thereby minimizing the number of page boundaries that are crossed when interpolating all of the pixels from said prediction area.

12. A subpixel interpolation filter in accordance with claim 11 further comprising:

means for temporarily storing pixel data adjacent a page boundary of a previously interpolated page of said frame store to enable pixel data residing adjacent said page boundary in a page of said frame store currently being interpolated to be interpolated without crossing said page boundary.

13. A subpixel interpolation filter in accordance with claim 9 for interpolating pixel data from a prediction area of an intra (I) picture and from a prediction area of a predicted (P) picture for subsequent use in reconstructing a bidirectional (B) frame, further comprising:

means for temporarily storing interpolated pixel data for one of said I or P pictures in a bidirectional data store and averaging it with the interpolated pixel data for the other of said I and P pictures while the latter is being interpolated; and means for writing the averaged I and P interpolated pixel data into said bidirectional data store for subsequent use in decoding said B frame.

14. A subpixel interpolation filter in accordance with claim 13 wherein said averaged I and P interpolated pixel data is written into said bidirectional data store in place of the I or P interpolated data that was read therefrom.

15. A horizontal pixel interpolation filter for a video decompression processor comprising:

an input for receiving consecutive words each containing N pixels from a prediction area of a video prediction frame, said consecutive words being received during successive clock cycles;

means for delaying said consecutive words of pixel data by one clock cycle;

means for holding:
a first pixel from each consecutive word received at said input, and
the immediately preceding word from said delay means; and means coupled to receive and average the adjacent pixels held in said holding means each clock cycle to provide successive sets of horizontally interpolated subpels for use by said video decompression processor.

16. A horizontal pixel interpolation filter in accordance with claim 15 wherein said video prediction frame is stored as a set of tiles in a random access memory (RAM), each tile containing pixel data and occupying one page of said RAM, said interpolation filter further comprising:

memory means for storing a subset of words from said prediction area adjacent a first side of a vertical page break; and means for inputting a word from said memory means to said holding means instead of inputting the immediately preceding word from said delay means when pixels adjacent a second side of said vertical page break are being interpolated.

17. A vertical interpolation filter for vertically interpolating the horizontally interpolated subpels provided by the filter of claim 15, comprising:

an input for receiving said successive sets of horizontally interpolated subpels during successive clock cycles;

means for buffering the successive sets of the horizontally interpolated subpels for averaging with vertically adjacent counterpart sets of horizontally interpolated subpels in said prediction area; and means for averaging the buffered sets of horizontally interpolated subpels with said counterpart sets to provide successive sets of horizontally and vertically interpolated subpels for use by said video decompression processor.

18. A bidirectional interpolation filter for use in combination with the horizontal and vertical interpolation filters of claim 17, said horizontal and vertical interpolation filters being used to interpolate pixel data from a prediction area of an intra (I) picture and from a prediction area of a predicted (P) picture, comprising:

means for temporarily storing interpolated pixel data for one of said I or P pictures in a bidirectional data store and averaging it with the interpolated pixel data for the other of said I and P pictures while the latter is being interpolated by said horizontal and vertical interpolation filters; and means for writing the averaged I and P interpolated pixel data into said bidirectional data store for subsequent use in decoding a bidirectional (B) frame.

19. A horizontal pixel interpolation filter in accordance with claim 15 wherein:

said averaging means comprise a plurality of adders coupled to said holding means, each adder adding two adjacent pixels from said holding means to provide a sum;

each adder includes a carry input adapted to add a binary "1" to the sum; and means are provided for truncating said sum by its least significant bit, resulting in a subpel that is rounded away from zero.

20. A horizontal pixel interpolation filter in accordance with claim 19 wherein said video prediction frame is stored as a set of tiles in a random access memory (RAM), each tile containing pixel data and occupying one page of said RAM, said interpolation filter further comprising:

memory means for storing a subset of words from said prediction area adjacent a first side of a vertical page break; and means for inputting a word from said memory means to said holding means instead of inputting the immediately preceding word from said delay means when pixels adjacent a second side of said vertical page break are being interpolated.

* * * * *